United States Patent
Marx

(10) Patent No.: US 12,122,233 B2
(45) Date of Patent: Oct. 22, 2024

(54) DEVICE FOR DETECTING A DRIVER DEMAND

(71) Applicant: ZF Active Safety GmbH, Koblenz (DE)

(72) Inventor: Andreas Marx, Hartenfels (DE)

(73) Assignee: ZF Active Safety GmbH, Koblenz, NY (US)

( * ) Notice: Subject to any disclaimer, the term of this patent is extended or adjusted under 35 U.S.C. 154(b) by 0 days.

(21) Appl. No.: 18/188,080

(22) Filed: Mar. 22, 2023

(65) Prior Publication Data

US 2023/0302897 A1 Sep. 28, 2023

(30) Foreign Application Priority Data

Mar. 24, 2022 (DE) .......................... 102022106983.4

(51) Int. Cl.
| | |
|---|---|
| *B60K 26/02* | (2006.01) |
| *B60T 7/04* | (2006.01) |
| *B60T 7/06* | (2006.01) |
| *G05G 1/30* | (2008.04) |

(Continued)

(52) U.S. Cl.
CPC ............ *B60K 26/021* (2013.01); *B60T 7/042* (2013.01); *B60T 7/06* (2013.01); *G05G 1/38* (2013.01); *G05G 1/42* (2013.01)

(58) Field of Classification Search
CPC .. G05G 1/30; G05G 1/38; G05G 1/42; G05G 5/03; B60K 26/02; B60K 26/021; B60T 7/04; B60T 7/042; B60T 7/06
See application file for complete search history.

(56) References Cited

U.S. PATENT DOCUMENTS

| | | | | |
|---|---|---|---|---|
| 9,141,129 B2 * | 9/2015 | Kim | .......................... | G05G 5/03 |
| 9,383,765 B2 * | 7/2016 | Kim | ...................... | B60T 8/4081 |
| 9,387,836 B2 * | 7/2016 | Ryu | .......................... | B60T 7/06 |

(Continued)

FOREIGN PATENT DOCUMENTS

| | | | |
|---|---|---|---|
| CN | 110027525 A | * | 7/2019 |
| DE | 602004004471 T2 | | 1/2008 |

(Continued)

OTHER PUBLICATIONS

Machine translation of DE 102010050815 A1 obtained on Feb. 26, 2024.*
Machine translation of CN 110027525 A obtained on Feb. 27, 2024.*

*Primary Examiner* — Adam D Rogers
(74) *Attorney, Agent, or Firm* — Kristin L. Murphy

(57) ABSTRACT

A device for detecting a driver demand, the device outputting a purely electronic actuating signal, includes an actuating surface, for a foot of a user, the actuating surface being displaceable in an actuation direction in order to generate the actuating signal. At least two compression bodies arranged one behind the other in the actuation direction are provided, each of which has one elastic element and one rigid element, which are arranged one behind the other in the actuation direction in such a way that one rigid element acts on one elastic element when the actuating surface is acted upon by an actuation force. In addition, a sensor system is provided, the signal of which permits an inference to be made regarding the displacement of the actuating surface and is usable for generating the actuating signal.

9 Claims, 2 Drawing Sheets

(51) Int. Cl.
*G05G 1/38* (2008.04)
*G05G 1/42* (2008.04)

(56) References Cited

U.S. PATENT DOCUMENTS

| | | | | |
|---|---|---|---|---|
| 9,487,198 B2 * | 11/2016 | Kim | ............ | G05G 5/03 |
| 10,579,089 B2 * | 3/2020 | Adoline | ............ | B60T 11/18 |
| 11,292,338 B2 * | 4/2022 | Burke | ............ | B60T 8/3255 |
| 11,332,109 B2 * | 5/2022 | Pflaum | ............ | B60T 8/409 |
| 2013/0086898 A1 * | 4/2013 | Yang | ............ | B60T 8/4077 |
| | | | | 60/413 |

FOREIGN PATENT DOCUMENTS

| | | | | |
|---|---|---|---|---|
| DE | 102010050815 A1 * | 5/2012 | ............ | B60T 7/042 |
| DE | 102014008787 A1 | 12/2014 | | |
| DE | 102014103167 A1 | 9/2015 | | |
| DE | 102017104278 A1 | 9/2018 | | |
| DE | 102020130412 A1 * | 5/2021 | ............ | B60T 13/746 |

* cited by examiner

DEVICE FOR DETECTING A DRIVER DEMAND

CROSS-REFERENCE TO RELATED APPLICATION

This application claims priority to German Priority Application No. 102022106983.4, filed Mar. 24, 2022, the disclosure of which is incorporated herein by reference in its entirety.

TECHNICAL FIELD

The disclosure relates to a device for detecting a driver demand, the device replacing, a conventional actuating pedal in a vehicle.

BACKGROUND

Foot-actuated pedals are traditionally used in the motor vehicle as a mechanism for interacting with the vehicle and for adjusting the engine power, for braking, or for coupling a transmission. Such pedals not only transmit, via their position, a desired value to the vehicle components, but rather also provide a feedback force on the foot of the driver. In the case of a brake pedal, the pedal behavior is conventionally generated by the brake pressure that has built up. This does not apply in newer vehicle systems, in which the driver demand is electronically transmitted according to the "by wire" principle.

SUMMARY

The disclosure addresses an issue of enabling an electronic detection of a driver demand in a reliable and installation space-saving way.

More specifically, a device for detecting a driver demand is disclosed, the device outputting a purely electronic actuating signal and having an actuating surface, for example for a foot of a user, which is displaceable in an actuation direction in order to generate the actuating signal. At least two compression bodies arranged one behind the other in the actuation direction are provided, each of which has one elastic element and one rigid element, which are arranged one behind the other in the actuation direction in such a way that one rigid element acts on one elastic element when the actuating surface is acted upon by an actuation force. In addition, a sensor system is provided, the signal of which permits an inference to be made regarding the displacement of the actuating surface and is usable for generating the actuating signal.

The device replaces a typical pedal in the footwell of a vehicle and is used, for all intents and purposes, as a pedal simulator, for example as a replacement for a brake pedal, an accelerator pedal, or even a clutch pedal.

The device can be highly compactly formed, so that the device requires only a small amount of installation space and, if necessary, can also be hidden in the footwell of the vehicle.

Due to the serial arrangement of at least two compression bodies, a redundancy is created, which enables a reliable and sufficiently precise detection of an actuation demand and, thus, generation of an actuating signal also in the event of failure of one of the compression bodies.

As is usually the case with a typical pedal, the user acts on the actuating surface with a force adapted to the intensity of the desired actuation. In the example of a brake pedal, this means, for example, that a light pressure on the actuating surface, for example, only a light touch, results in an actuating signal that induces only a small braking torque, while a forceful pressing-down, which corresponds to pushing through a conventional brake pedal in a full application of the brakes, results in an actuating signal that requests a maximum braking torque.

Such a resolution of the actuation force is possible due to the combination of elastic and rigid elements, which enable a precise force transmission and also a fine-tuning of the detection of the actuation force.

The elastic elements also ensure a damping of the displacement movement of the actuating surface, which feels natural for the user and imparts feedback to the user regarding the actuation force. In addition, the elastic elements also provide a restoring force for the actuating surface. If the user removes the foot from the actuating surface and, thus, ends the generation of the actuating signal, the elastic elements return the actuating surface to their neutral starting position.

Since the device can be simply designed in such a way that the actuating surface is purely linearly displaceable, a swivelable arrangement can be dispensed with, which reduces the number of mechanically movable components and the required installation space.

The device merely needs to absorb the actuation force applied by the user, but does not need to transmit this actuation force in mechanical form, and so the device does not need to be designed to bear high loads. For example, it is not necessary or possible to directly build up a sufficient brake pressure by the pressure of the foot upon the actuating surface, since a direct mechanical or hydraulic connection is not provided between the device and the vehicle component to be operated.

The force-displacement characteristic curve of the compression bodies is determinable in advance, so that a force-displacement characteristic curve of the entire device is easily determinable with sufficient precision to obtain an actuating signal having sufficient resolution.

In one exemplary variant, the rigid elements of the compression bodies each have a contour projecting in the actuation direction, each contour penetrating the adjacent elastic element when a force is applied onto the actuating surface.

The contour is formed, for example, by multiple separate projections protruding in the actuation direction. The projections have, for example, in a longitudinal section, a shape tapering toward the free end of the projection, such as an arch or dome shape.

When the contour, in the non-actuated condition, rests against the particular elastic element without preload or with only slight preload, a two-stage force-displacement characteristic curve of the compression body can be achieved. In a first stage, the contour penetrates the elastic element, which requires a lower force, while, in the second stage, the rigid element rests against the elastic element without further movement play, so that a quasi fluid situation exists and a higher force is necessary to bring about a further displacement.

When both compression bodies are designed in this way, a progressive force-displacement characteristic curve can be achieved, which permits a sensitive detection also of low actuation forces and small movements of the actuating surface, while high actuation forces are implementable without excessive travel.

During the penetration of the projections into the particular elastic element, the reaction force behavior of the device is determined by the material properties of the elastic elements and the number and shape of the projections. After full penetration, the elastic elements act as quasi fluid reaction disks. The relationship of force with respect to distance is then determined only by the compressibility of the elastic elements. After the projections have completely immersed into the elastic elements, the force-distance relationship is mostly linear.

In one exemplary arrangement, the device generally has a non-linear force-displacement characteristic curve, which can be easily predefined by the properties of the rigid elements and the elastic elements. This is also useful in order to be able to easily carry out an adaptation to different requirements of vehicle manufacturers.

The rigid elements should be so dimensionally stable that they do not deform to a significant extent even at a maximum actuation force that the user can apply.

In one exemplary arrangement, the elastic elements are disk-shaped. The elastic elements can be made, for example, of any suitable polymer material.

An adaptation can be carried out, for example, via the thickness, stiffness, and elasticity of the elastic elements and via the number, shape, for example the cross-section and length, of the above-described contours of the rigid elements.

The two compression bodies can differ in terms of their damping and spring properties, in order to be able to more finely tune the overall force-displacement characteristic curve of the device.

The rigid elements and the elastic elements are advantageously to be configured in such a way that they are as fail-safe and cost-effective as possible.

Instead of one single force-displacement characteristic curve, an entire characteristic map is also usable, which also includes, for example, influences of an ambient temperature, of aging processes or other parameters, and which is determined in advance via experimental determination or a simulation. In one exemplary arrangement, these data elements are retrievably stored in a control unit.

The compression bodies can provide, due to their design, a noiseless end point, which is reached when the compressibility of the elastic elements has been exhausted by the force applicable by the user. Therefore, no further components are required to form an end stop.

In order to absorb the actuation force, the elastic element furthest away from the actuating surface preferably rests against a rigid back wall of the device, so that the actuation force can be introduced via the back wall of the device into a rigid vehicle component. In this way, a counter force to the foot force of the user is also provided.

For this purpose, it is favorable when the device is designed to be mounted at a bulkhead in the footwell of a vehicle. As a result, the actuation surface can be easily obliquely aligned, even though the device is box-shaped overall, thereby resulting in the arrangement of the actuating surface of a vehicle pedal that is familiar to the user.

In this case, the mounting is easily possible, for example, by a bolted connection. It is only necessary to lay power and data cables to the particular component to be actuated or to an assigned control unit in the vehicle. A breakthrough to the engine compartment is not necessary.

In order to detect the displacement movement of the actuating surface, in one exemplary arrangement, the sensor system includes two displacement sensors, which detect the movement of the rigid elements in the actuation direction. The use of two displacement sensors permits the creation of a redundancy, in order to increase the operational reliability of the device, so that, for example, further operation of the vehicle can be ensured if one of the displacement sensors or one of the compression bodies should fail.

For example, a signal transmitter is arranged at each rigid element, the signal transmitter interacting with a displacement sensor at a housing of the device, so that the movement of the rigid elements is detectable, the movement forming a direct measure of the movement of the actuating surface. The displacement sensor can be based on any suitable principle and can be, for example, a Hall sensor, but also a capacitive or inductive sensor.

The use of two displacement sensors enables the detection of the absolute travel of the actuating surface and of a movement differential between the displacement distances covered by the two rigid elements, which can also be used for generating the actuating signal.

The sensor system can include, in addition to the displacement sensors, a pressure sensor, upon which the force arising due to the actuation of the actuating surface acts and which, in this way, also delivers a measure of the actuation force, which can be used primarily in the event of a failure of the displacement sensors in order to generate an actuating signal or in the normal operation for checking the plausibility of the measuring signals of the displacement sensors. A pressure sensor is a cost-effective measure for increasing redundancy.

The pressure sensor can be embedded, for example, into one of the elastic elements. Quasi fluid conditions prevail, encapsulated in an elastic element, so that a pressure proportional to the actuation force is present at the pressure sensor.

In addition to the signals of the displacement sensors and, possibly, of the pressure sensor, further suitable data can also be gathered, of course, which a control unit can take into account in addition to the force-displacement characteristic curve of the device, in order to generate the actuating signal.

In one exemplary arrangement, the control unit also carries out a plausibility check of the data delivered from the sensor system, if necessary in conjunction with other parameters, in order to detect a possible interference and appropriately adapt the generated actuating signal.

If more than two compression bodies are provided, a displacement sensor is optionally arranged at each rigid element, which, in the event of a partial failure, results in a better actuating signal or, at full functionability, improves the plausibility check.

BRIEF DESCRIPTION OF DRAWINGS

The disclosure is described in greater detail in the following on the basis of an exemplary arrangement with reference to the attached figures, in which.

DETAILED DESCRIPTION

Figure 1:
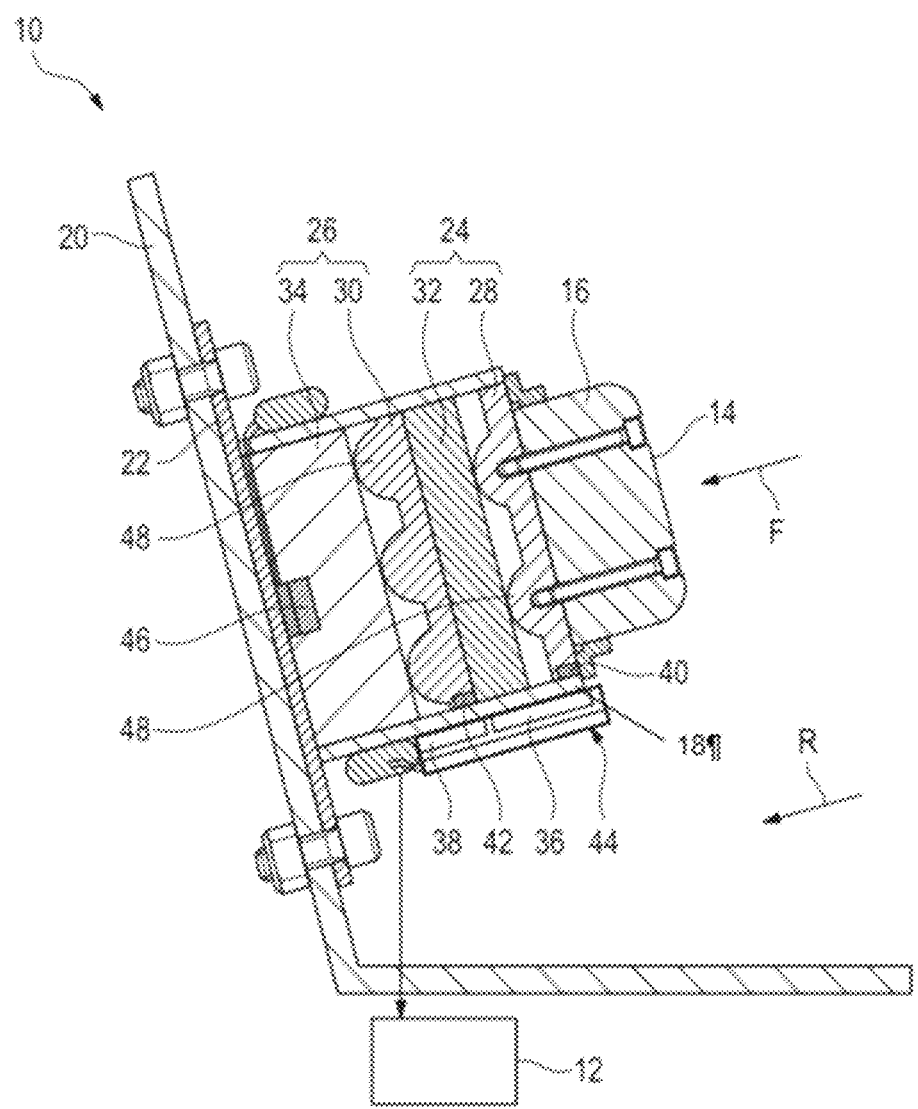
FIG. 1 shows a schematic sectional view of a device according to the disclosure for detecting a driver demand for actuating a vehicle component.

FIG. 1 shows a device 10 for detecting a driver demand, the device 10 being used in this case for detecting an actuation force F, which a user applies with his/her foot onto the device 10 and which is a measure of the extent to which a vehicle component is to be actuated.

In this example, the device 10 is a pedal simulator and may replace a conventional brake pedal, optionally, however, also an accelerator pedal or a clutch pedal.

The device 10 generates a purely electronic actuating signal, which includes the driver demand regarding the intensity of the actuation of the vehicle component and which is transmitted (not shown) to a control unit 12 at the vehicle component (indicated in FIG. 1) to be actuated or to a higher-order control unit in the vehicle.

The foot of the user acts on an actuating surface 14, which is formed on a front side of an actuating pad 16. This corresponds to the control surface of a conventional pedal. The actuating pad 16 and the actuating surface 14 are made, in this case, of a conventional material for conventional vehicle pedals.

The actuating surface 14 delimits, at one side, an approximately box-shaped housing 18 of the device 10, which, overall, is fixedly connected to the vehicle, specifically to a bulkhead 20 of the vehicle in this case. For this purpose, a rigid back wall 22 of the housing 18 is bolted at the bulkhead 20. A breakthrough in the bulkhead 20 to the engine compartment of the vehicle for through-routing cables or hydraulic lines is not provided here.

Since the bulkhead 20 extends obliquely in the footwell, the actuating surface 14 is also oblique here, which corresponds to the usual arrangement of a pedal in the vehicle.

Two compression bodies 24, 26 are arranged in the housing 18, the compression bodies 24, 26 being arranged one behind the other along an actuation direction R between the back wall 22 and the actuating pad 16. Optionally, further compression bodies can be provided in a row with the two compression bodies 24, 26.

Each of the compression bodies 24, 26 includes a rigid element 28, 30, respectively, and an elastic element 32, 34, respectively, wherein each rigid element 28, 30 is arranged closer to the actuating pad 16 than the elastic element 32, 34.

The actuating surface 14 and the rigid elements 28, 30 and the elastic element 32 are displaceable in the direction toward the back wall 22 in relation to the housing 18 in the actuation direction R. The device 10 has no further possibilities for mechanical motion.

The rigid elements 28, 30 and the elastic elements 32, 34 are plate- or disk-shaped in this case.

The rigid elements 28, 30 are designed in such a way that they negligibly deform even at a maximum applied actuation force F. The elastic elements 32, 34, however, are made of a deformable, elastic material, for example, a suitable elastomer, which yields when compressed and which provides an elastic restoring force.

An applied actuation force F is transmitted via the actuating surface 14, the rigid element 28, and the elastic element 32 of the first compression body 24 to the rigid element 30 and the elastic element 34 of the second compression body 26 and, from there, onto the back wall 22 and onto the bulkhead 20. The bulkhead 20 and the back wall 22 offer a counter force.

The displacement movement of the actuating surface 14 along the actuation direction R is detected by two displacement sensors 36, 38 of a sensor system, each of which interacts with a signal transmitter 40, 42, respectively, each of which is fixedly arranged at the rigid elements 28, 30, respectively. The displacement sensors 36, 38 can be designed in any suitable way and are, for example, capacitive or inductive sensors or Hall sensors.

The displacement sensors 36, 38 are arranged, in this case, on a circuit board 44 on one side of the housing 18.

In addition to the two displacement sensors 36, 38, a pressure sensor 46 is also provided here, which is embedded into the elastic element 34 of the second compression body 26.

The rigid elements 28, 30 each have, on their side directed toward the particular elastic element 32, 34, a contour 48 protruding in the actuation direction R, which is designed in such a way that the contour 48 can penetrate the particular elastic element 32, 34.

In the example shown here, the contours 48 are multiple individual projections distributed over the surface of the rigid elements 28, 30 and, in the longitudinal section, are arch-shaped or dome-shaped.

The contours 48 of the two rigid elements 28, 30 are designed to be either identical or different.

In the neutral, unloaded condition represented in FIG. 1, the free ends of the contours 48 rest on the elastic elements 32, 34 without preload or only with slight preload, without being significantly pressed into the elastic elements 32, 34.

Figure 2:
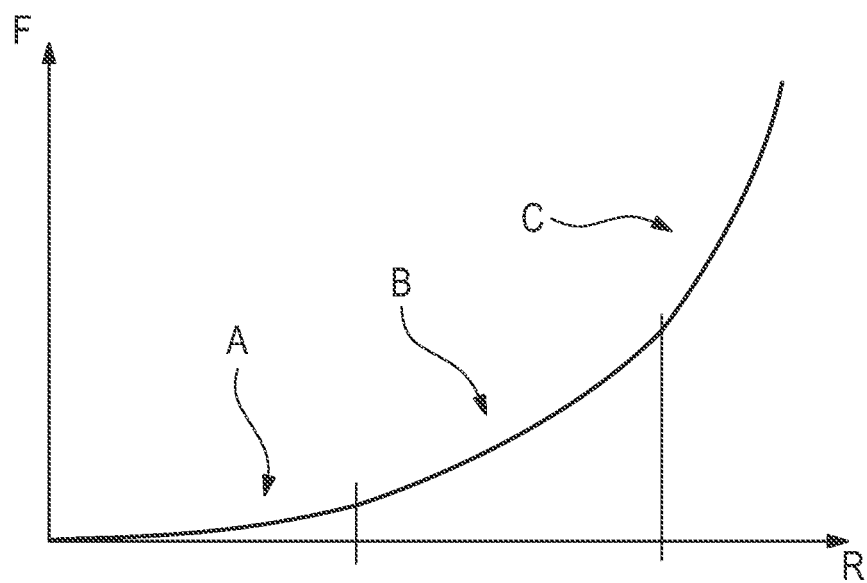
FIG. 2 shows a schematic representation of a force-displacement characteristic curve of the device from FIG. 1.

If an actuation force F is applied onto the actuating surface 14, the contours 48 are gradually pressed into the elastic elements 32, 34 with increasing force F, depending on the design of the contours 48 and the material properties of the elastic elements 32, 34. The force required to displace the actuating surface 14 further in the actuation direction R increases as the displacement of the rigid elements 28, 30 increases. A corresponding progressive force-displacement characteristic curve is shown in FIG. 2.

In order to express the driver demand, the user presses with his/her foot onto the actuating surface 14 and, due to the applied actuation force F, displaces the rigid elements 28, 30 along the actuation direction R in the direction toward the back wall 22. The movement of the signal transmitters 40, 42 at the rigid elements 28, 30 is detected by the displacement sensors 36, 38. In addition, a pressure increase is detected by the pressure sensor 46.

This data is transmitted to the control unit 12. The signals of the displacement sensors 36, 38 and, if necessary, of the pressure sensor 46 can infer the displacement of the actuating surface 14, and the control unit 12 uses this data for generating the actuating signal. For this purpose, the known force-displacement characteristic curve or a known multi-dimensional force-displacement characteristic map of the compression bodies 24, 26 and, if necessary, further suitable parameters is/are used. The actuating signal is transmitted to the vehicle component to be actuated.

In order to generate the actuating signal, the displacement signals of the two displacement sensors 36, 38 are combined, wherein the data can be used individually or in combination, for example, a difference of the two displacement measurements, in order to infer the applied actuation force F and to check a plausibility of the measured data.

An actuating signal can also be generated in the event of a failure of one of the displacement sensors 36, 38 or of a compression body 24, 26, for the purpose of which only the signal of the remaining displacement sensor 36, 38 is used.

For example, in the event of a failure of the first compression body 24, the travel of the rigid element 30 of the second compression body can be detected by the displacement sensor 38.

In the event of a failure of the elastic element 34 of the second compression body 26, the displacement of the rigid elements 28, 30 can still be detected by both displacement sensors 36, 38, since the rigid element 30 is acted upon by the elastic element 32. In addition, the rigid element 30 acts directly on the pressure sensor 46, so that a significant pressure signal is generated, from which an actuating signal can be derived.

Changes in the compression bodies 24, 26, for example, are derivable from an observation of the travel differential.

For this purpose, the control unit 12 is designed for detecting and interpreting such situations and appropriately adapting the generation of the actuating signal.

During the actuation of the device 10 from the neutral starting position shown in FIG. 1, the contours 48 initially penetrate the particular elastic element 32, 34 at the beginning of the displacement movement, which requires only a relatively small force (see area A in FIG. 2).

As soon as the contours 48 have completely penetrated the particular elastic element 32, 34 and, thus, the rigid element 28, 30 rests via its entire surface against the elastic element 32, 34, respectively, in a planar manner, the particular elastic element 32, 34 behaves in a quasi fluid manner. The required compression force increases considerably at this point in time.

In this example, the device 10 is designed in such a way that the contours 48 at the rigid element 28 have already fully penetrated the elastic element 32 of the first compression body 24 before this is the case for the contours 48 of the rigid element 30 of the second compression body 26 for the elastic element 34. This area is marked by B in FIG. 2.

The beginning of the area C in FIG. 2 characterizes the point of the displacement of the actuating surface 14, at which the contour 48 of the rigid element 30 of the second compression body 26 has fully penetrated the elastic element 34. In this area, the actuation force F required for further displacing the actuating surface 14 increases considerably.

Overall, the force-displacement characteristic curve of the device 10 is designed to be progressive, wherein, initially, a low actuation force F results in a relatively great displacement of the actuating surface 14 and, as the displacement continues, an increasingly greater actuation force F is necessary for a further displacement of the actuating surface 14 along the actuation direction R.

In this way, an end point of the movement, at which the maximum foot force of the user no longer suffices for further compression, also automatically results. Therefore, a rigid stop, which could possibly result in noise development, is not provided.

If the actuation force F subsides, the elastic properties of the elastic elements 32, 34 provide the restoring force necessary for moving the rigid elements 28, 30 and the actuating surface 14 back into the neutral starting position.

The maximum travel of the actuating surface 14 and, thus, also of the detection path of the displacement sensors 36, 38, is selected to be so great that even a small displacement of the actuating surface 14, i.e., a small intentional actuating signal, is easily detected.

The properties of the compression bodies 24, 26, for example, the material properties and the thickness of the elastic elements 32, 34 and the number, shape, and length of the projections forming the contours 48, determine the force-displacement characteristic curve. The variation thereof therefore enables the adaptation of the force-displacement characteristic curve.

The invention claimed is:

1. A device for detecting a driver demand, comprising: an actuating surface, which is displaceable in an actuation direction in order to generate an electronic actuating signal, wherein at least two compression bodies arranged one behind the other in the actuation direction are provided, each of which has an elastic element and a rigid element, which are arranged one behind the other in the actuation direction in such a way that one rigid element acts on one elastic element when the actuating surface is acted upon by an actuation force, and having a sensor system, the signal of which permits an inference to be made regarding displacement of the actuating surface and is usable for generating the actuating signal; wherein the rigid elements each have a contour projecting in the actuation direction, each contour penetrating the adjacent elastic element with the actuation force is applied onto the actuation surface; and wherein each contour of the rigid elements is formed by multiple separate projections protruding in the actuation direction.

2. The device according to claim 1, wherein the projections have, in a longitudinal section, a shape tapering toward a free end.

3. The device according to claim 1, wherein the device has a force-displacement characteristic curve, and, the two compression bodies differ in terms of their damping and spring properties.

4. The device according to claim 1, wherein the elastic element furthest away from the actuating surface rests against a rigid back wall of the device.

5. The device according to claim 1, wherein the device is designed to be mounted at a bulkhead in a footwell of a vehicle, so that the actuating surface extends obliquely.

6. The device according to claim 1, wherein the device simulates a brake pedal, an accelerator pedal, or a clutch pedal.

7. The device according to claim 1, wherein the sensor system includes two displacement sensors, which detect the movement of the rigid elements in the actuation direction.

8. The device according to claim 1, wherein the sensor system includes a pressure sensor, on which a pressure arising due to the displacement of the actuating surface acts.

9. The device according to claim 1, wherein the projections have, in a longitudinal section, an arch shape.

* * * * *